US011921205B2

United States Patent
Wang

(10) Patent No.: US 11,921,205 B2
(45) Date of Patent: Mar. 5, 2024

(54) METHOD FOR ELIMINATING MISJUDGMENT OF REFLECTIVE LIGHTS AND OPTICAL SENSING SYSTEM

(71) Applicant: PIXART IMAGING INC., Hsin-Chu (TW)

(72) Inventor: Guo-Zhen Wang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 132 days.

(21) Appl. No.: 17/535,108

(22) Filed: Nov. 24, 2021

(65) Prior Publication Data

US 2022/0163666 A1 May 26, 2022

Related U.S. Application Data

(63) Continuation-in-part of application No. 17/102,558, filed on Nov. 24, 2020.

(51) Int. Cl.
*G01S 17/08* (2006.01)
*G01S 7/497* (2006.01)
(Continued)

(52) U.S. Cl.
CPC .............. *G01S 17/08* (2013.01); *G01S 7/497* (2013.01); *G01S 17/04* (2020.01); *G05D 1/0238* (2013.01);
(Continued)

(58) Field of Classification Search
CPC ...... G01S 17/931; G01S 7/4817; G01S 17/42; G01S 17/89; G01S 17/10; G01S 7/4814;
(Continued)

(56) References Cited

U.S. PATENT DOCUMENTS 8,716,641 B2  5/2014  Matsumoto
10,360,684 B2  7/2019  Seitz et al.
(Continued)

FOREIGN PATENT DOCUMENTS

CN  101981437 A  2/2011
CN  105361817 A  3/2016
(Continued)

OTHER PUBLICATIONS

USPTO, Office Action dated Feb. 1, 2023 for U.S. Appl. No. 17/102,558.

*Primary Examiner* — Michael P Stafira
(74) *Attorney, Agent, or Firm* — Li & Cai Intellectual Property (USA) Office

(57) ABSTRACT

An optical sensing system and a method for eliminating misjudgment of a reflective light are provided. The optical sensing system includes a first light source, a second light source, a light sensor, and a processor. The processor is configured to: control the first light source to scan a horizontal detection area; control the light sensor to capture a first frame by receiving first reflective lights from the horizontal detection area; obtain a first reflection pattern, and analyze the first reflection pattern to determine whether an object is within the first portion; if so, control the second light source to scan a first vertical detection area; control the light sensor to capture a second frame from the first vertical detection area; process the second frame to obtain a second reflection pattern, and analyze the second reflection pattern to determine whether the object is detected by a misjudgment.

18 Claims, 10 Drawing Sheets

(51) Int. Cl.
*G01S 17/04* (2020.01)
*G05D 1/00* (2006.01)
(52) U.S. Cl.
CPC ............... *G05D 2201/0203* (2013.01); *G05D 2201/0215* (2013.01)
(58) Field of Classification Search
CPC ........ G01S 7/497; G01S 7/4816; G01S 7/484; G01S 17/08; G01S 7/4812; G01S 17/46; G01S 17/87; G01S 7/4868; G01S 17/86; G01S 17/894; G01S 7/4811; G01S 7/493; G01S 7/481; G01S 7/4815; G01S 7/4863; G01S 7/4865; G01S 17/48; G01S 7/4861; G01S 7/4813; G01S 17/06; G01S 7/4804; G01S 7/4972; G01S 2007/4975; G01S 5/16; G01S 7/4876; G01S 17/36; G01S 17/50; G01S 17/58; G01S 17/88; G01S 2013/932; G01S 7/487; G01S 17/93; G01S 2007/4977; G01S 11/12; G01S 17/04; G01S 7/489; G01S 7/4914; G01S 13/931; G01S 17/02; G01S 17/95; G01S 7/003; G01S 7/4808; G01S 1/54; G01S 1/70; G01S 17/32; G01S 17/66; G01S 19/49; G01S 3/783; G01S 7/4802; G01S 7/4818; G01S 7/483; G01S 7/486; G01S 7/491; G01S 7/4913; G01S 7/4918; G01S 7/499; G01S 13/426; G01S 13/86; G01S 13/867; G01S 13/87; G01S 17/00; G01S 17/003; G01S 17/18; G01S 17/26; G01S 17/34; G01S 17/74; G01S 17/90; G01S 2013/9318; G01S 2013/93185; G01S 2013/9319; G01S 2013/9322; G01S 2013/93273; G01S 3/781; G01S 3/782; G01S 5/163; G01S 7/00; G01S 7/48; G01S 7/4911; G01S 7/4873; G01S 13/862; G01S 3/784; G01S 7/52001; G01S 7/52004; G01S 7/56; G05D 2201/0203; G05D 1/0246; G05D 1/0248; G05D 1/0238; G05D 2201/0213; G05D 1/024; G05D 2201/0215; G05D 1/0088; G05D 1/02; G05D 1/0227; G05D 1/0231; G05D 1/0242; G05D 1/0274; G05D 1/0214; G05D 1/0061; G05D 1/0225; G05D 1/0234; G05D 1/0255; G05D 2201/0212; G05D 1/0219; G05D 1/0261; G05D 1/027; G05D 2201/0201; G05D 2201/0207; G05D 1/0221; G05D 1/0223; G05D 1/0236; G05D 1/0259; G05D 1/0272; G05D 1/0276; G05D 1/028; G05D 1/0285; G05D 1/101; G05D 25/02
See application file for complete search history.

(56) References Cited

U.S. PATENT DOCUMENTS

| | | | |
|---|---|---|---|
| 2012/0075422 A1* | 3/2012 | Wang | G01S 17/89 348/46 |
| 2015/0265853 A1* | 9/2015 | Humphrey | G01C 5/00 356/3.09 |
| 2017/0332871 A1* | 11/2017 | Sung | A47L 11/33 |
| 2018/0014709 A1 | 1/2018 | O'Brien et al. | |
| 2018/0246518 A1 | 8/2018 | Vogel et al. | |
| 2019/0220025 A1* | 7/2019 | Chen | G05D 1/0214 |
| 2019/0220033 A1 | 7/2019 | Cho et al. | |
| 2020/0093342 A1 | 3/2020 | Jeong et al. | |
| 2020/0170470 A1* | 6/2020 | Liggett | A47L 9/2852 |
| 2020/0386873 A1 | 12/2020 | Wang et al. | |
| 2021/0016449 A1* | 1/2021 | Wang | G06T 7/70 |
| 2021/0072383 A1 | 3/2021 | Noguchi et al. | |
| 2022/0163666 A1 | 5/2022 | Wang | |
| 2022/0163794 A1 | 5/2022 | Hwangbo et al. | |

FOREIGN PATENT DOCUMENTS

| | | | | |
|---|---|---|---|---|
| CN | 106239504 A | | 12/2016 | |
| CN | 107101589 A | | 8/2017 | |
| CN | 107305386 A | | 10/2017 | |
| CN | 210464466 U | | 5/2020 | |
| CN | 210464466 U | * | 5/2020 | ............ G01C 11/30 |
| DE | 102016107900 A1 | | 11/2017 | |
| DE | 102019102669 A1 | * | 8/2019 | ........... G01S 17/936 |
| EP | 3082006 A2 | * | 10/2016 | ............ G01S 17/46 |
| IN | 107847098 A | | 3/2018 | |
| JP | 202070121 A | | 5/2020 | |
| KR | 20120108290 A | * | 10/2012 | |
| KR | 101571719 B1 | * | 11/2015 | |
| KR | 1020200114860 A | | 10/2020 | |
| WO | WO-2014033055 A1 | * | 3/2014 | ............ B25J 9/1697 |
| WO | WO2016045593 A1 | | 3/2016 | |
| WO | WO-2019064062 A1 | * | 4/2019 | ................ B60S 1/02 |
| WO | WO-2020100835 A1 | * | 5/2020 | ................ B60R 1/00 |
| WO | WO-2020117766 A1 | * | 6/2020 | .......... A47L 11/4002 |
| WO | WO2020213955 A1 | | 10/2020 | |
| WO | WO2019116549 A1 | | 12/2020 | |

* cited by examiner

METHOD FOR ELIMINATING MISJUDGMENT OF REFLECTIVE LIGHTS AND OPTICAL SENSING SYSTEM

CROSS-REFERENCE TO RELATED PATENT APPLICATION

This application is a continuation-in-part of U.S. application Ser. No. 17/102,558, filed on Nov. 24, 2020 and entitled "METHOD FOR ELIMINATING MISJUDGMENT OF REFLECTIVE LIGHT AND OPTICAL SENSING SYSTEM," the entire disclosures of which are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for improving judgment made by an optical sensing system, and more particularly to a method for eliminating misjudgment of reflective lights sensed by the optical sensing system.

BACKGROUND OF THE DISCLOSURE

The most common product of an autonomous robot in the market is a robot cleaner that can automatically clean the floor of a house without being manually operated by a user. A conventional autonomous robot may include a sensor for detecting obstacles on the floor of the house and can plan a route by robotics technology in order to navigate around the house.

When the autonomous robot automatically navigates in an area, one of the most important tasks is to avoid obstacles on its navigation path. Various conventional sensors can be used in the autonomous robot for detecting the obstacles. For example, a light sensor can be used to detect the obstacles by sensing detection lights emitted by a light source when the detection light is reflected by the obstacle on the navigation path.

However, misjudgments may occur to the autonomous robot since the light sensor may be confused when receiving lights reflected by a highly-reflective wall or floor. The lights reflected by the highly-reflective object may generate signals that are too strong, which result in a misjudgment and a false alarm.

SUMMARY OF THE DISCLOSURE

In response to the above-referenced technical inadequacies, the present disclosure provides a method for eliminating misjudgment of reflective lights and an optical sensing system.

In one aspect, the present disclosure provides an optical sensing system, which includes a first light source, a second light source, a light sensor, and a processor. The first light source is configured to scan a horizontal detection area by emitting a horizontal linear light. The second light source is configured to scan a first vertical detection area by emitting a first vertical linear light, in which the horizontal linear light is perpendicular to the first vertical linear light, and the first vertical detection area crosses a first portion of the horizontal detection area. The processor is configured to: control the first light source to scan the horizontal detection area by emitting the horizontal linear light; control the light sensor to capture a first frame by receiving first reflective lights from the horizontal detection area; process the first frame to obtain a first reflection pattern, and analyze the first reflection pattern to determine whether an object is within the first portion; in response to determining that the object is within the first portion, control the second light source to scan the first vertical detection area by emitting the first vertical linear light; control the light sensor to capture a second frame by receiving second reflective lights from the first vertical detection area; and process the second frame to obtain a second reflection pattern, and analyze the second reflection pattern to determine whether the object is detected by misjudgment caused by the first reflective lights.

In another aspect, the present disclosure provides a method for eliminating misjudgment of reflective lights that are sensed by an optical sensing system. The optical sensing system includes a first light source, a second light source, a light sensor, and a processor. The method is performed by the processor and includes: controlling the first light source to scan a horizontal detection area by emitting a horizontal linear light, in which the horizontal linear light is perpendicular to a first vertical linear light emitted by the second light source, and a first vertical detection area scanned by emitting the first vertical linear light crosses a first portion of the horizontal detection area; controlling the light sensor to capture a first frame by receiving first reflective lights from the horizontal detection area; processing the first frame to obtain a first reflection pattern, and analyzing the first reflection pattern to determine whether an object is within the first portion; in response to determining that the object is within the first portion, controlling the second light source to scan the first vertical detection area by emitting the first vertical linear light; controlling the light sensor to capture a second frame by receiving second reflective lights from the first vertical detection area; and processing the second frame to obtain a second reflection pattern, and analyzing the second reflection pattern to determine whether the object is detected by misjudgment caused by the first reflective lights.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
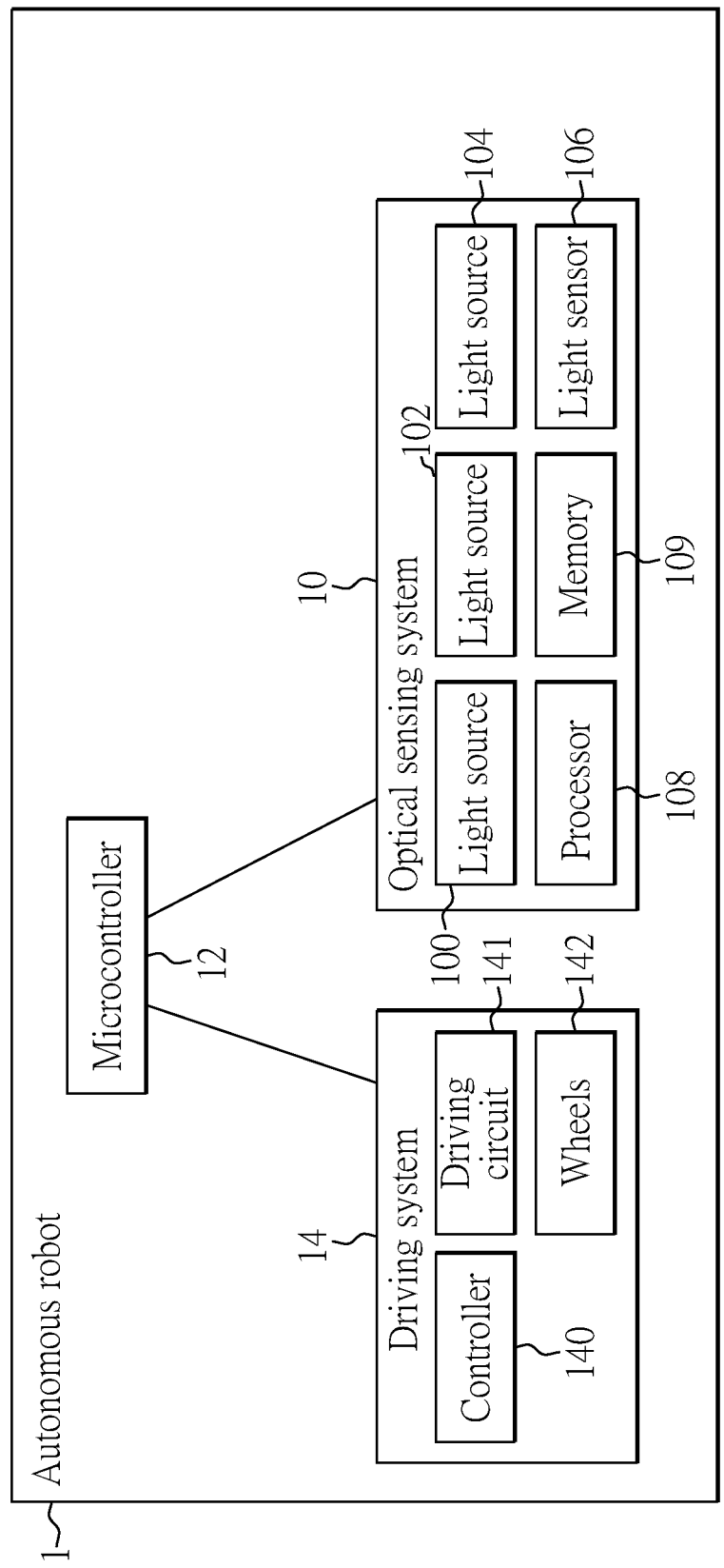
FIG. 1 is a block diagram of an autonomous robot that includes an optical system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a block diagram of an autonomous robot that includes an optical system according to one embodiment of the present disclosure.

Reference can be made to FIG. 1. The present disclosure provides an optical sensing system 10, which includes light sources 100, 102, 104, a light sensor 106, a processor 108, and a memory 109.

The processor 108 is, for example, a central processing unit (CPU), or other programmable general-purpose or special-purpose microprocessor, digital signal processor (DSP), programmable controllers, application-specific integrated circuits (ASIC), a programmable logic device (PLD), a graphics processing unit (GPU), other similar devices, or a combination of these devices. The processor 108 can execute program codes, software modules, instructions, and the like that are recorded in the memory 109 to implement the method for eliminating misjudgment of reflective lights sensed by the optical sensing system of the embodiment of the present disclosure.

The memory 109 can be configured to store images, program codes, software modules, and other data. It can be, for example, any type of fixed or removable random-access memory (RAM), read-only memory (ROM), flash memory, hard disks or other similar devices, integrated circuits and combinations thereof.

Specifically, the present disclosure is related to an optical sensing system and a method for eliminating misjudgment caused by reflective lights from highly reflective environment. According to one concept the present disclosure, the misjudgment can be eliminated by comparing a reflection pattern obtain from reflected vertical linear lights with another reflection pattern obtained from reflected horizontal linear lights.

Furthermore, the optical sensing system 10 can be embodiment in an autonomous robot 1, which is also shown in FIG. 1. The autonomous robot 10 can be, for example, a cleaning machine, i.e., a robotic vacuum cleaning device, which uses multiple light sources (in a light sensor module 100) to emit multiple linear lights in a traveling direction ahead of the autonomous robot 1.

Figure 2:
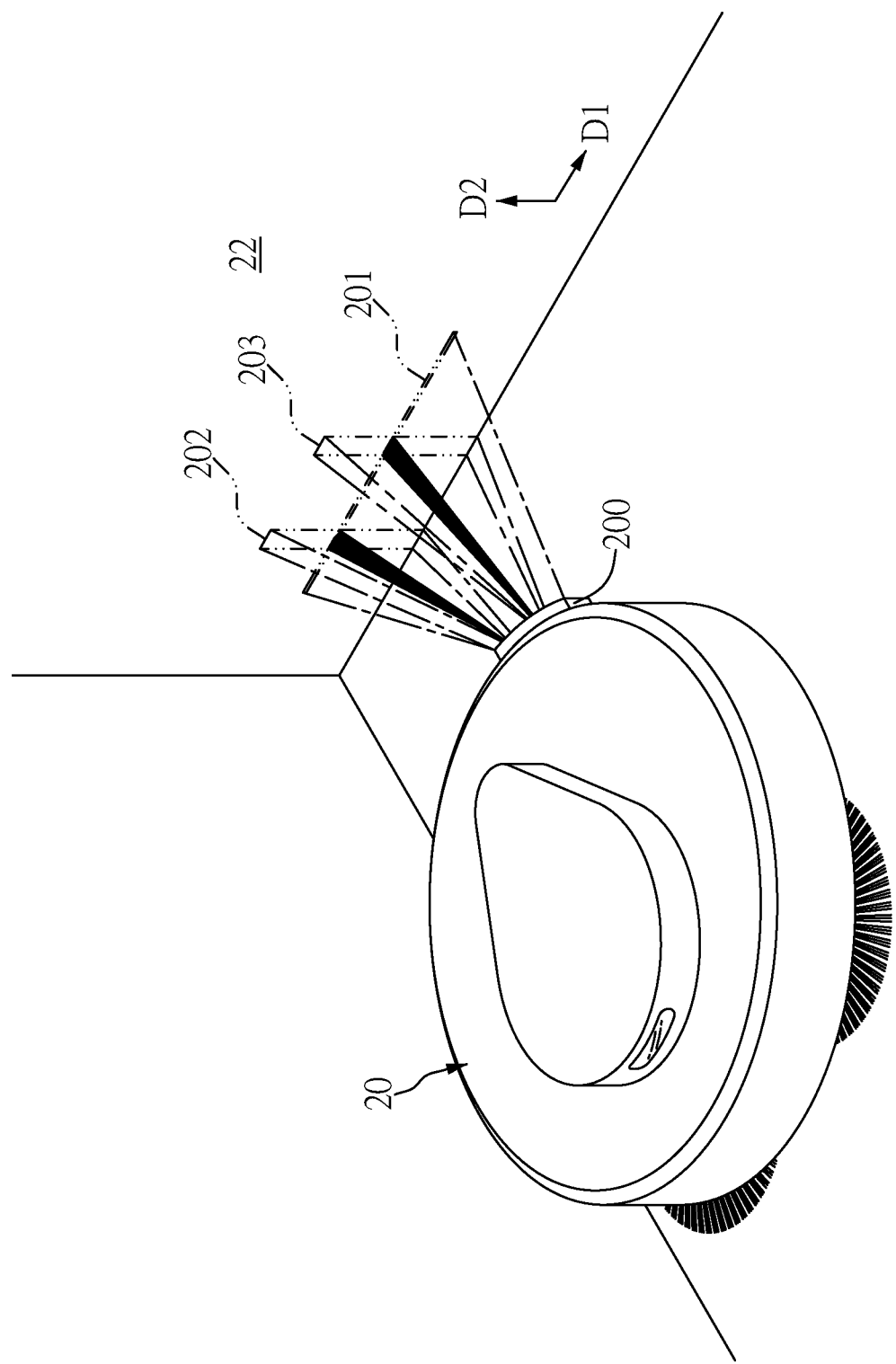
FIG. 2 is a schematic diagram depicting an autonomous robot emitting linear lights to detect any object ahead of the autonomous robot according to one embodiment of the disclosure.

Reference can be further made to FIG. 2, which is a schematic diagram depicting an autonomous robot emitting linear lights to detect any object ahead of the autonomous robot according to one embodiment of the disclosure.

As shown in FIG. 2, the light sources 100, 102, 104 can be light emitting devices, such as light bulbs or light emitting diodes, and can be disposed in the light sensor module 200 to emit a horizontal linear light 201, a first vertical linear light 202 and a second vertical linear light 203 onto a wall 22, respectively. The light sensor module 200 also includes the light sensor 106 used to receive the lights reflected by the wall 22. In some embodiments, the autonomous robot 20 can be driven to make a detour in order to avoid colliding with the wall 22 or any obstacle.

Further, the autonomous robot 1 has a microcontroller 12 that is electrically connected to other circuit systems for operating the functions of the autonomous robot 1. The autonomous robot 1 can include the optical sensing system 10, a driving system 14, and optionally, a cleaning system 16, or the autonomous robot 1 with the driving system 14 can be included in the optical sensing system 10, and the present disclosure is not limited thereto.

Figure 3B:
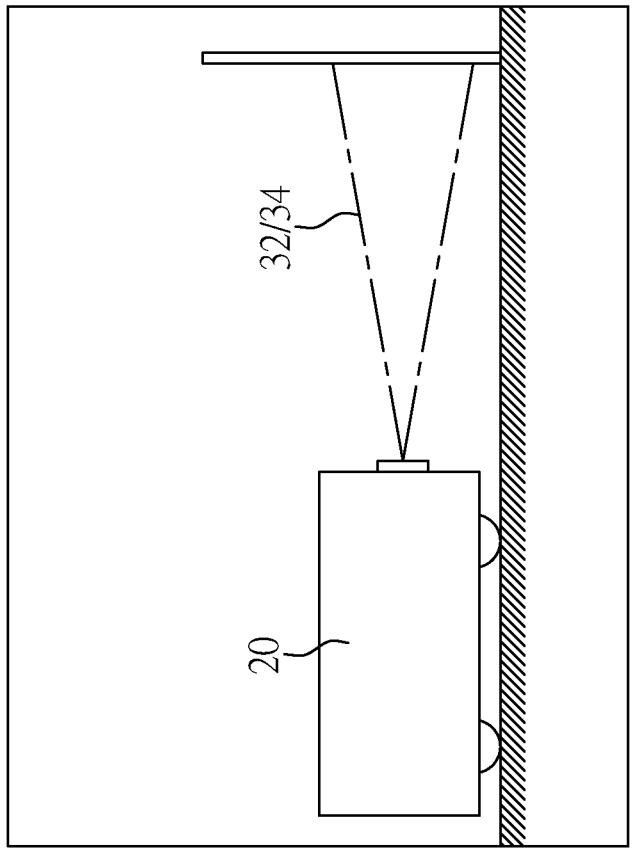
FIGS. 3A and 3B are top and side views schematically showing that the horizontal linear light, the first vertical linear light and the second vertical linear light emitted from the autonomous robot according to one embodiment of the present disclosure.
Figure 3A:
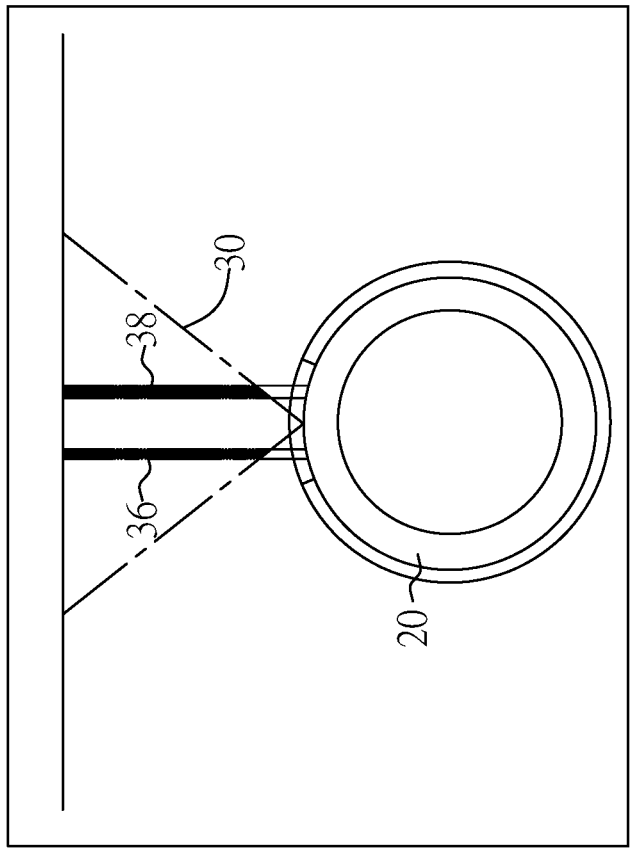

FIGS. 3A and 3B are top and side views schematically showing that the horizontal linear light, the first vertical linear light and the second vertical linear light emitted from the autonomous robot according to one embodiment of the present disclosure.

Reference can be made to FIGS. 2, 3A and 3B together. As shown, the light source 200 can scan a horizontal detection area 30 by emitting the horizontal linear light 201, the light source 200 can scan a first vertical detection area 32 by emitting the first vertical linear light 202, and the light source 200 can scan a second vertical detection area 34 by emitting the second vertical linear light 203. In more detail, the horizontal linear light 201, along a horizontal direction D1, is perpendicular to the first vertical linear light 202 and the second vertical linear light 203 along a vertical direction D2 as shown in FIG. 2, the first vertical detection area 32 crosses a first portion 36 of the horizontal detection area 30, and the second vertical detection area 34 crosses a second portion 38 of the horizontal detection area 30, as shown in FIGS. 3A and 3B.

Figure 4:
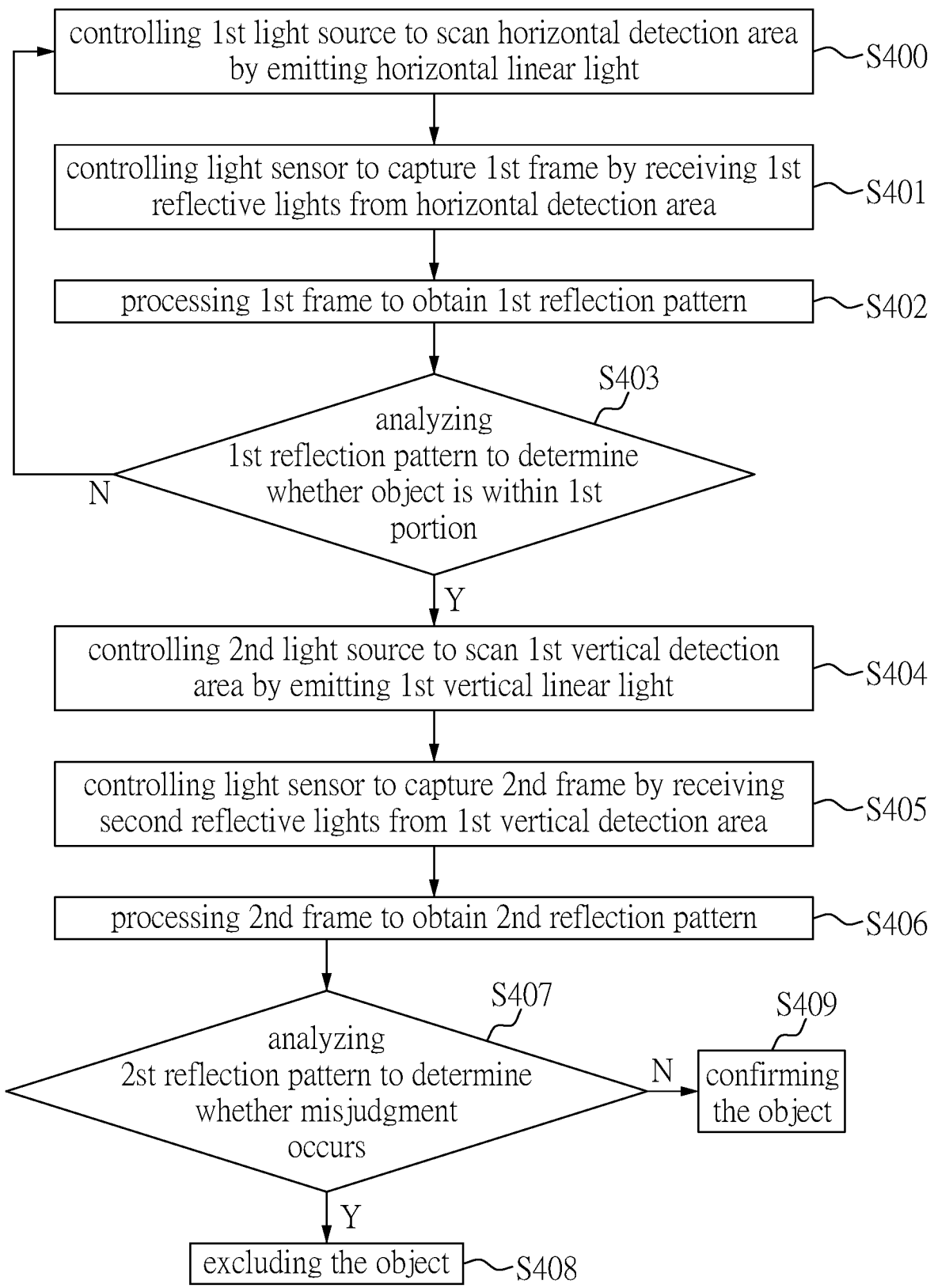
FIG. 4 is a flow chart of a method for eliminating misjudgment of reflective lights according to one embodiment of the present disclosure.

Reference can be further made to FIG. 4, which is a flow chart of a method for eliminating misjudgment of reflective lights according to one embodiment of the present disclosure. Reference can be made to FIG. 4, the method for eliminating misjudgment of reflective lights can be performed by the processor 108 mentioned above. It should be noted that the method can be performed by using only one light source that provides one of the vertical linear lights, but the present disclosure is not limited thereto, the following steps are illustrated based on one light source (e.g., the light source 102), and the light source 104 can be controlled in a similar way.

The method can include the following steps:

Step S400: controlling the first light source to scan a horizontal detection area by emitting a horizontal linear light. For example, the light source 200 can be controlled to scan the horizontal detection area 30 mentioned above.

Step S401: controlling the light sensor to capture a first frame by receiving first reflective lights from the horizontal detection area.

Figure 5B:
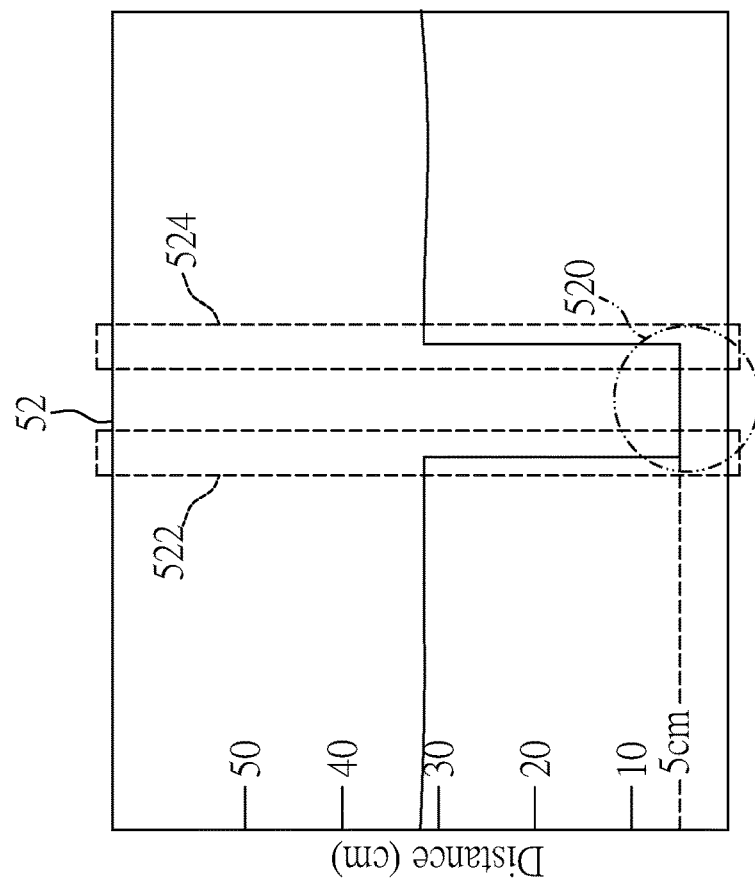
FIG. 5B is a schematic diagram showing the first reflection pattern obtained by the processor according to one embodiment of the present disclosure.
Figure 5A:
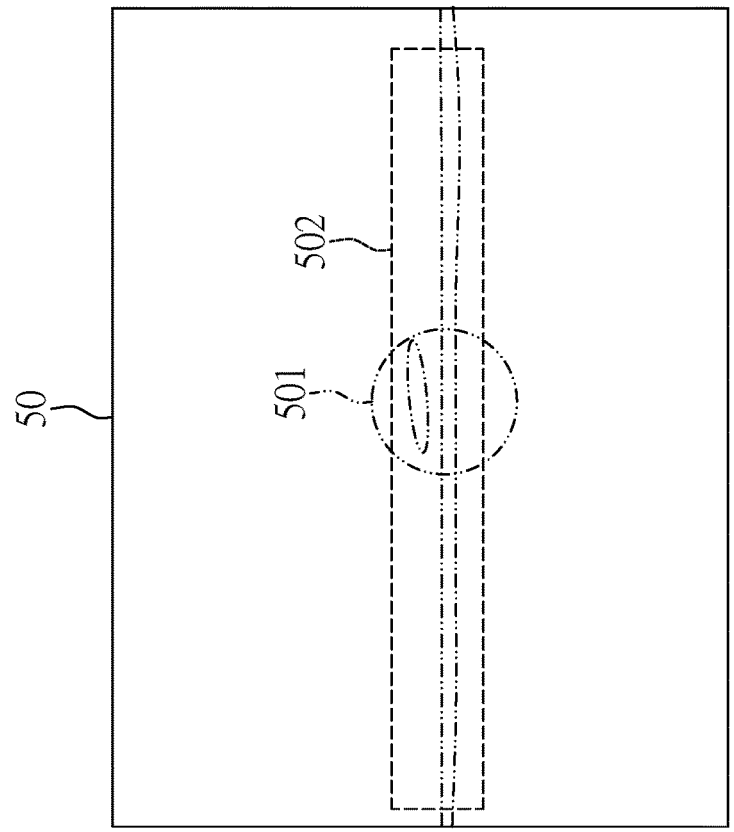
FIG. 5A is a schematic diagram showing the first frame captured by the light sensor according to one embodiment of the present disclosure.

Reference can be made to FIG. 5A, which is a schematic diagram showing the first frame captured by the light sensor according to one embodiment of the present disclosure. As shown in the first frame 50, the lights reflected by the highly-reflective object may generate signals that are too strong, such as a reflection portion 501, which may cause a misjudgment and a false alarm. Furthermore, the processor 108 can receive the first frame 50 and store it in the memory 109.

Step S402: processing the first frame to obtain a first reflection pattern.

Reference can be made to FIG. 5B, which is a schematic diagram showing the first reflection pattern obtained by the processor according to one embodiment of the present disclosure. In this step, intensities of the first reflective lights recorded in the first frame 50 can be calculated, and then a first reflection pattern 52 according to the intensities corresponding to an area 502 corresponding to the horizontal detection area 30 can be generated.

Step S403: analyzing the first reflection pattern to determine whether an object is within the first portion.

As shown in FIG. 5B, the lights reflected by the highly-reflective object may generate signals that are too strong, such as a reflection portion 501, which exactly causes a misjudgment, for example, a fake object 520 may be detected and has a distance of 5 cm separated from the autonomous robot 20, and a position of the object 520 along the horizontal direction D1 can also be obtained.

In response to obtaining the position of the object 520, it can be further determined that whether the object 520 is within the first portion 36 (or is within the second portion 38) of FIG. 3A. In the present embodiment, whether the object 520 is within the first portion 36 can be determined by determining whether the position of the object 520 is within an area 522 that is corresponding to the first portion 36 in the first reflection pattern 52, and an area that is corresponding to the second portion 38 in the first reflection pattern 52 can be used in the same way. For example, since the position of the object 520 is within the areas 522 and 524 in the first reflection pattern, it can be determined that the object 520 is within the first portion 36 and the second portion 38.

In response to determining that the object is within the first portion, the method proceeds to step S404: controlling the second light source to scan the first vertical detection area by emitting the first vertical linear light. For example, the light source 102 can be controlled by the processor 108 to scan the first vertical detection area 32 by emitting the first vertical linear light 202.

Similarly, if the object 520 is determined within the second portion 38, the light source 104 can be controlled by the processor 108 to scan the second vertical detection area 34 by emitting the second vertical linear light 203.

Step S405: controlling the light sensor to capture a second frame by receiving second reflective lights from the first vertical detection area.

Step S406: processing the second frame to obtain a second reflection pattern.

Figures 6A, 6B:
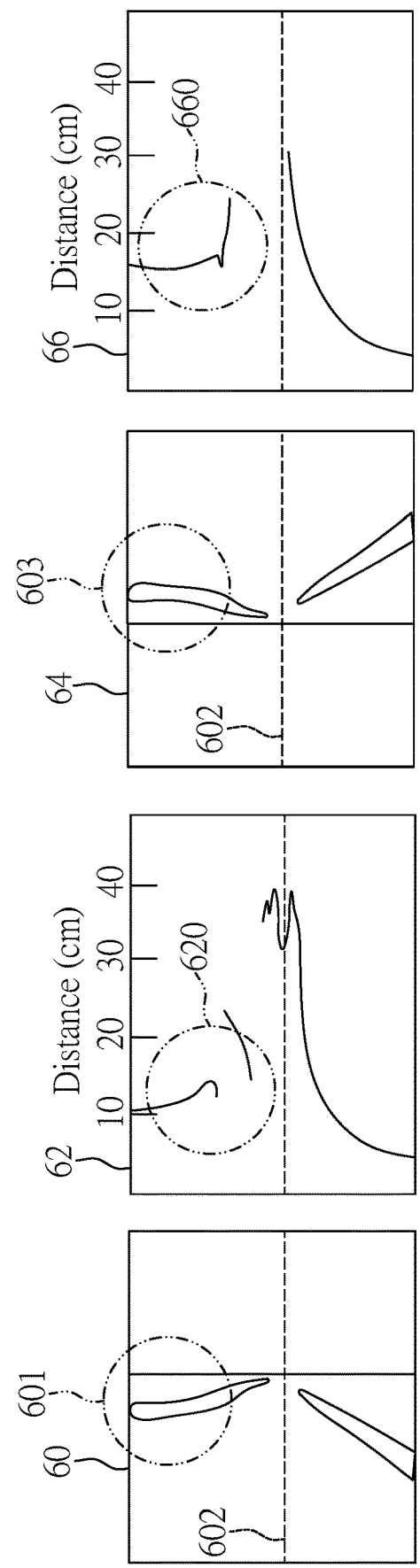
FIG. 6A is a schematic diagram showing the second frame captured by the light sensor and the second reflection pattern obtained by the processor according to one embodiment of the present disclosure.
FIG. 6B is a schematic diagram showing a third frame captured by the light sensor and a third reflection pattern obtained by the processor according to one embodiment of the present disclosure.

Reference can be made to FIG. 6A, which is a schematic diagram showing the second frame captured by the light sensor and the second reflection pattern obtained by the processor according to one embodiment of the present disclosure. Steps S405 and S406 are similar to steps S401 and S402, and thus the repeated descriptions are omitted.

Step S407: analyzing the second reflection pattern to determine whether a misjudgment occurs, that is, to determine whether the object is detected by misjudgment caused by the first reflective lights.

As shown in the second frame 60 of FIG. 6A, the lights reflected by the highly-reflective object may generate signals that are too strong, such as a reflection portion 601, which may cause a misjudgment and a false alarm. However, since the first vertical linear light 202 is perpendicular to the horizontal linear light 201, the highly-reflective object may generate reflective lights in different way, as shown in FIGS. 5A and 6A, respectively.

After the processor 108 process the second frame 60 to obtain the second reflection pattern 62, another object 620 may be detected at a position different from the object 520, and information below a ground line 602 can be omitted in FIG. 6A. For example, a distance between the light sensor 106 and the object 620 is detected to be about 10 cm, which is different from the distance between the light sensor 106 and the object 520, which is about 5 cm. Therefore, it can be determined that the object 520 is detected by misjudgment caused by the first reflective lights.

In response to determining that the misjudgment occurs, the method proceeds to step S406: excluding the object.

In response to determining that the misjudgment does not occur, the method proceeds to step S407: confirming the object.

For example, if the distance between the light sensor 106 and the object 620 is close to or equal to the distance between the light sensor 106 and the object 520, it can be determined that the object 520 is not detected by the misjudgment caused by the first reflective lights, and the object 520 can be confirmed, and can be further determined as an obstacle for the autonomous robot 20.

Reference can be made to FIG. 6B, which is a schematic diagram showing a third frame captured by the light sensor and a third reflection pattern obtained by the processor according to one embodiment of the present disclosure.

Similarly, the light sensor 106 can be controlled by the processor 108 to capture a third frame 64 by receiving third reflective lights from the second vertical detection area 34. The third frame 64 can then be processed by the processor 108 to obtain a third reflection pattern 66, and analyze the third reflection pattern 66, together with the first reflection pattern 52, to determine whether the object 520 is detected by misjudgment caused by the first reflective lights.

As shown in FIG. 6B, yet another object 660 may be detected at a position different from the object 520, and information below a ground line 602 can be omitted in FIG. 6B. It can be seen that a distance between the light sensor 106 and the object 660 is detected to be about 15 cm, which is different from the distance between the light sensor 106 and the object 520, which is about 5 cm. Therefore, it can also be determined that the object 520 is detected by misjudgment caused by the first reflective lights.

Reference is made to FIG. 1 again. The driving system 14 includes a controller 140 that controls a driving circuit 141 to drive the autonomous robot 1 to move or rotate through using wheels 142, e.g., a kind of omni-directional wheels, and the controller 140, the driving circuit 141 and the wheels 142 can also be controlled by the processor 108 directly, and the present disclosure is not limited thereto.

The autonomous robot 1 (or 20) can be a wheeled automatic robot that can itself move around an area and intelligently avoid obstacles ahead of it. For example, the autonomous robot 20 includes an optical sensing system 10 that is generally used to perform obstacle detection in the traveling direction of the autonomous robot 20.

Figure 7:
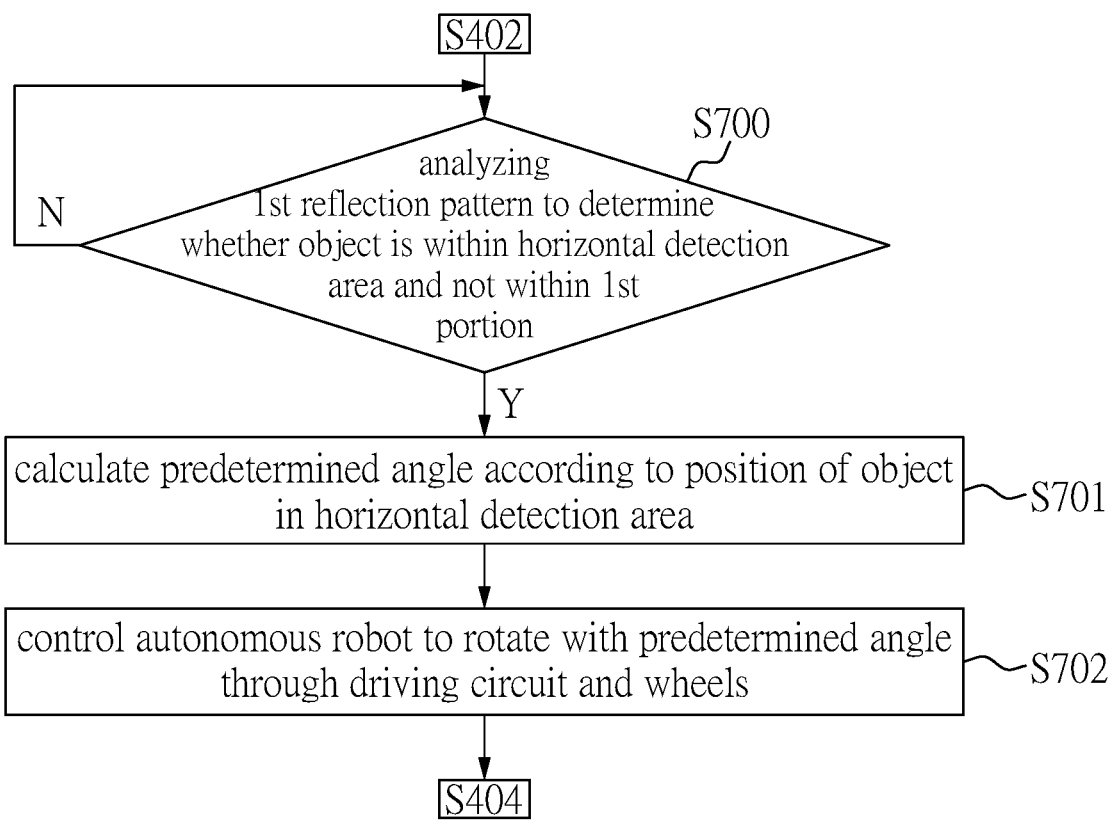
FIG. 7 is another flow chart of the method for eliminating misjudgment of reflective lights according to one embodiment of the present disclosure.

Reference is further made to FIG. 7, which is another flow chart of the method for eliminating misjudgment of reflective lights according to one embodiment of the present disclosure. Steps in FIG. 7 is suitable for a case that the object is determined to be within the horizontal detection area, but not within the first portion or the second portion.

As shown in FIG. 7, the method can further include the following steps after step S402 is performed:

Step S700: analyzing the first reflection pattern to determine whether the object is within the horizontal detection area and is not within the first portion.

In response to determining that the object is within the horizontal detection area and is not within the first portion, the method proceeds to step S701: calculate a predetermined angle according to a position of the object in the horizontal detection area.

Step S702: control the autonomous robot to rotate with a predetermined angle through the driving circuit and the plurality of wheels. Therefore, the object can be within the rotated first portion of the rotated horizontal detection area.

Afterward, the method can proceed back to step S404 of FIG. 4.

Figure 8A:
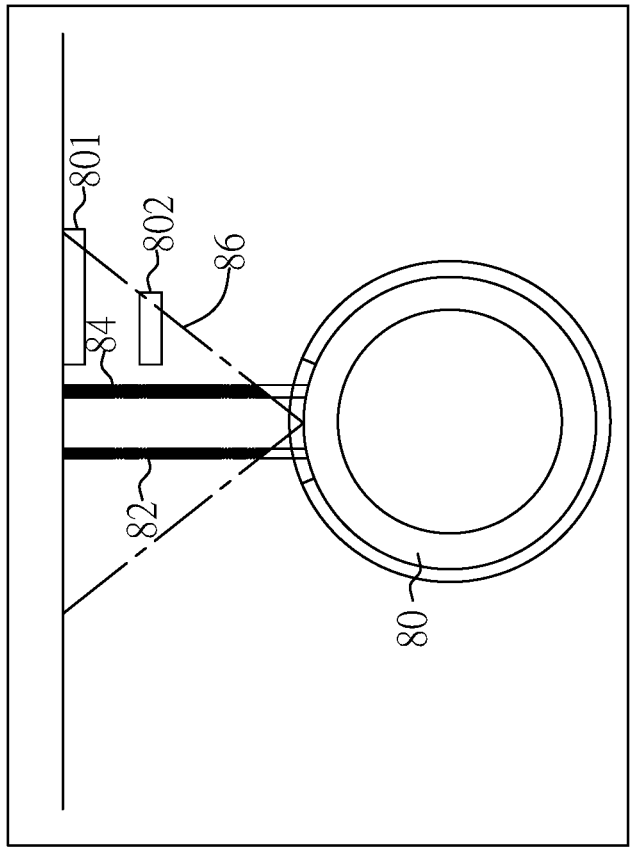
FIGS. 8A and 8B are top views schematically showing a rotation operation of FIG. 7 performed by the autonomous robot according to one embodiment of the present disclosure.
Figure 8B:
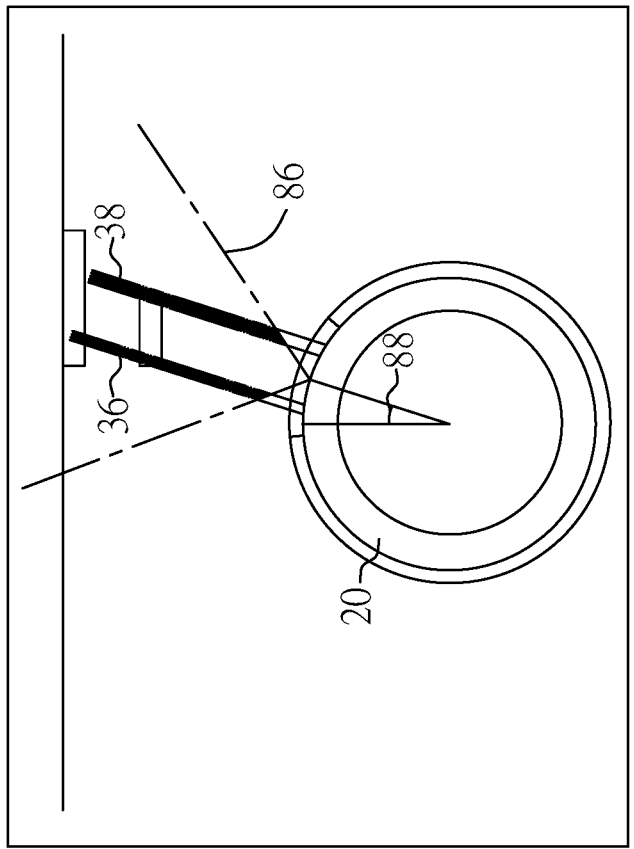

For example, reference can be made to FIGS. 8A and 8B, which are top views schematically showing a rotation operation of FIG. 7 performed by the autonomous robot according to one embodiment of the present disclosure.

As shown, after steps 400, 401, and 402 are performed, a highly-reflective wall 801 reflects the horizontal linear light emitted from the autonomous robot 80. The processor 108 further detects that a fake object 802 is within the horizontal detection area 86, but not within the first portion 82 and the second portion 84, as shown in FIG. 8A.

Therefore, according to steps 701 and 702, the processor 108 calculates an angle 88 according to a position of the object 802 in the horizontal detection area 86, and controls the autonomous robot 80 to rotate with the angle 88 through the driving circuit 141 and the wheels 142. Therefore, the object 802 can be within the rotated first portion 63 (and the rotated second portion 38) of the rotated horizontal detection area 86. Since that the object 802 is within the first portion 36, steps S403 to S409 can then be similarly performed to eliminate the misjudgment.

Figure 9:
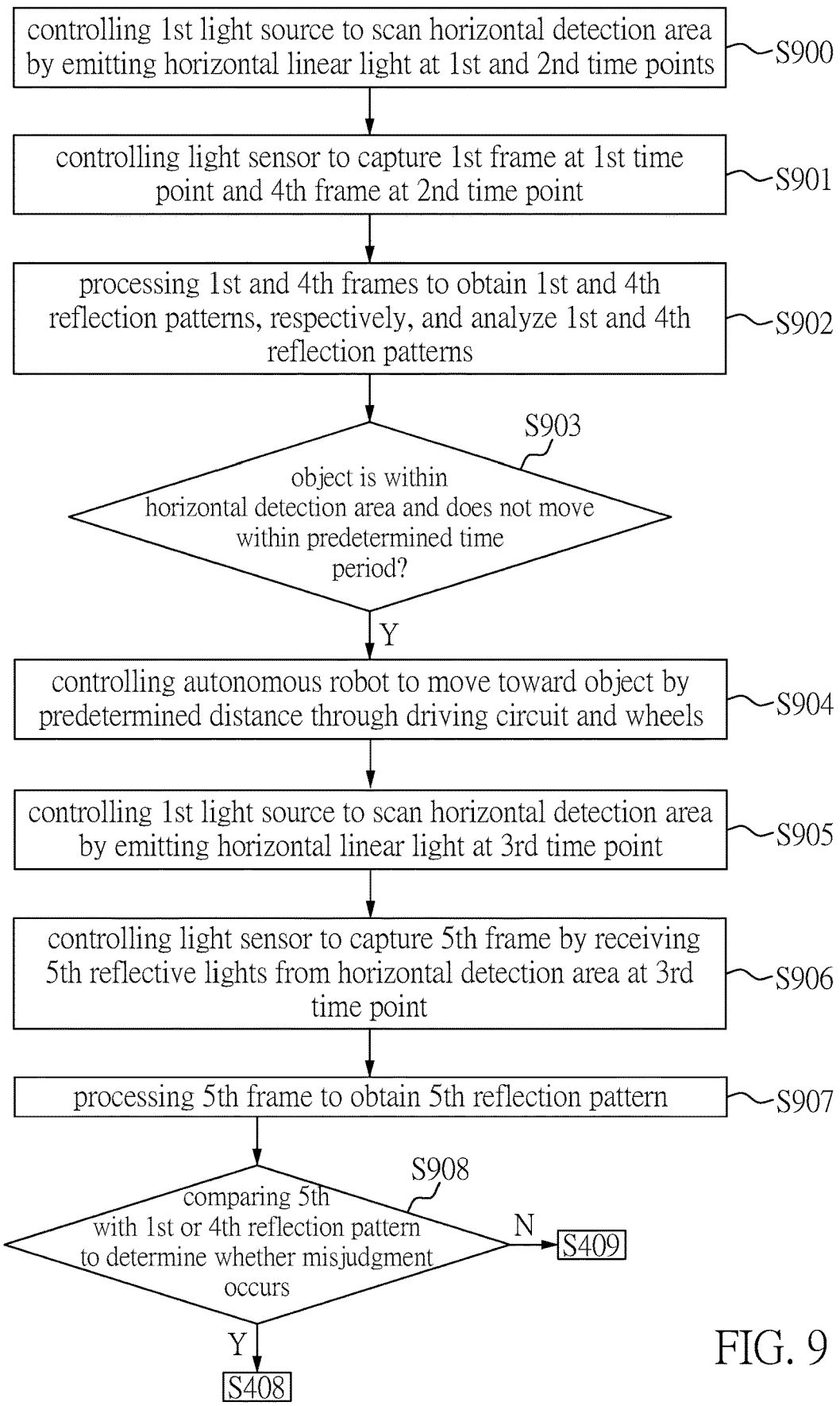
FIG. 9 is yet another flow chart of the method for eliminating misjudgment of reflective lights according to one embodiment of the present disclosure.

Reference is further made to FIG. 9, which is yet another flow chart of the method for eliminating misjudgment of reflective lights according to one embodiment of the present disclosure. Steps in FIG. 9 is suitable for a case that the object is determined as a fixed object.

As shown in FIG. 9, the method can further include the following steps:

Step S900: controlling the first light source to scan the horizontal detection area by emitting the horizontal linear light at a first time point and a second time point. It should be noted that the first time point is separated from the second time point with a predetermined time period.

Step S901: controlling the light sensor to capture the first frame at the first time point, and capturing a fourth frame by receiving the fourth reflective lights from the horizontal detection area at the second time point.

Step S902: processing the first frame and the fourth frame to obtain the first reflection pattern and a fourth reflection pattern, respectively, and analyze the first reflection pattern and the fourth reflection pattern to determine whether the object is within the horizontal detection area and does not move within the predetermined time period.

Steps S900 to S902 are performed to confirm that the object is a fixed object.

In response to determining that the object is within the horizontal detection area and does not move within the predetermined time period, the method proceeds to step S903: controlling the autonomous robot to move toward the object by a predetermined distance through the driving circuit and the plurality of wheels.

Figure 10A:
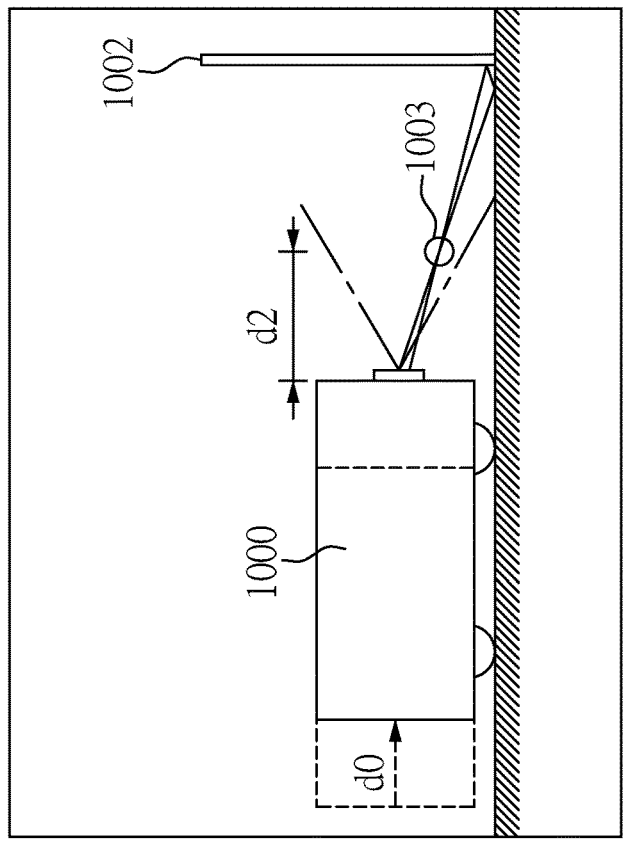
FIGS. 10A and 10B are side views schematically showing a moving operation performed by the autonomous robot according to one embodiment of the present disclosure.
Figure 10B:
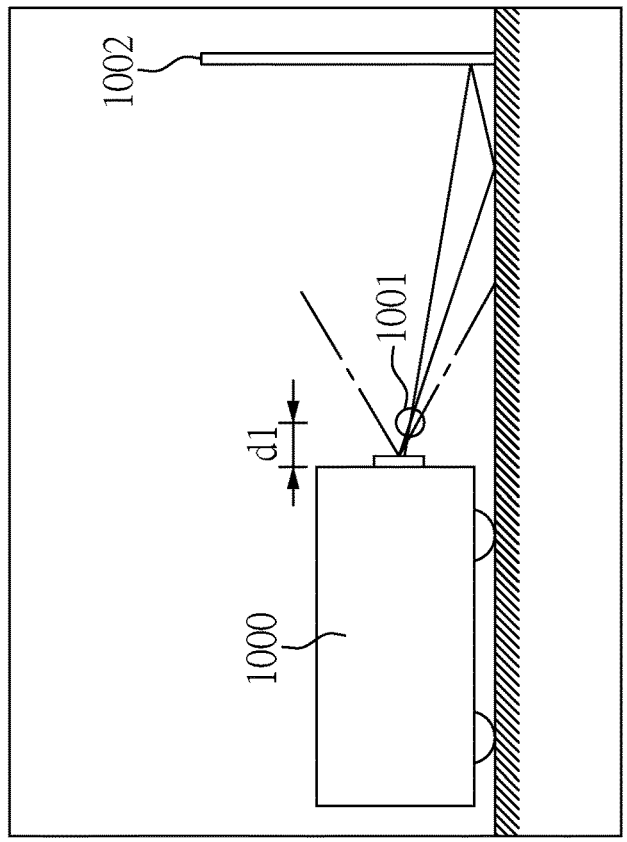

Reference can be made to FIGS. 10A and 10B, which are side views schematically showing a moving operation performed by the autonomous robot according to one embodiment of the present disclosure. As shown, at the second time point (FIG. 10A), an object 1001 is detected to be fixed and has a distance d1 separated from the autonomous robot 1000. However, the object 1001 is a fake object caused by reflective lights from a highly-reflective wall 1002.

In order to eliminate the misjudgment caused by the reflective lights, the autonomous robot 1000 is controlled to move toward the object 1001 through the driving circuit 141 and the wheels 142. It should be noted that the autonomous robot 1000 can also be controlled to move away from the object 1001, the present disclosure is not limited thereto.

After the autonomous robot 1000 is controlled to move toward the object by the predetermined distance d0 at a third time point (FIG. 10B), the method can proceed to step S904.

Step S904: controlling the first light source to scan the horizontal detection area by emitting the horizontal linear light at the third time point, which is after the autonomous robot moves the predetermined distance.

Step S905: controlling the light sensor to capture a fifth frame by receiving the fifth reflective lights from the horizontal detection area at the third time point.

Step S906: processing the fifth frame to obtain a fifth reflection pattern.

Step S907: comparing the fifth reflection pattern with the first reflection pattern or the fourth reflection pattern to determine whether the misjudgment occurs, that is, to determine whether the object is detected by misjudgment caused by the first reflective lights and the fourth reflective lights.

In more detail, as shown in FIG. 10A, whether the object 1001 is detected by misjudgment caused by the first reflective lights and the fourth reflective lights can be determined by determining whether a variation from the first reflection pattern or the fourth reflection pattern to the fifth reflection pattern corresponds to the predetermined distance d0 moved by the autonomous robot 1000. For example, the fifth reflection pattern can be analyzed by the processor to obtain an object 1003, which is also caused by reflective lights from the highly-reflective wall 1002 and has a distance d2 larger than the distance d1.

That is, the fake object 1001 does not move as the autonomous robot 1000, and thus a variation or a trend between the distances (e.g., between the distances d1 and d2) before and after the light sensor 106 (or the autonomous robot 1000) is moved, can be observed to determine whether the misjudgment occurs. On the other hand, if the object 1001 moves as the autonomous robot 1000, the object 1001 is determined as a real object.

Therefore, in response to determining that the variation from the first reflection pattern or the fourth reflection pattern to the fifth reflection pattern does not correspond to the predetermined distance moved by the autonomous robot, it can be further determined that whether the object 1001 is detected by misjudgment caused by the first reflective lights and the fourth reflective lights.

Afterward, the method can proceed back to step S408 in response to determining the misjudgment occurs, or proceed back to step S409 in response to determining the misjudgment does not occur.

Therefore, the method provided by the present disclosure can be utilized in the case that the object is determined as a fixed object, so as to eliminate the misjudgment caused by the reflective lights sensed by the optical sensing system 10.

In conclusion, the optical sensing system and the method for eliminating a misjudgment of reflective lights provided by the present disclosure can eliminate the misjudgment by comparing a reflection pattern obtain from reflected vertical linear lights with another reflection pattern obtained from reflected horizontal linear lights.

Furthermore, the optical sensing system and the method provided by the present disclosure can be utilized, together with the driving system of the autonomous robot, in a case that the object is within the horizontal detection area but not within the vertical detection areas, so as to eliminate the misjudgment. Moreover, the system and the method provided by the present disclosure can also be utilized for a detected object that is determined as a fixed object, so as to eliminate the misjudgment caused by the reflective lights sensed by the optical sensing system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical sensing system, comprising:
   a first light source configured to scan a horizontal detection area by emitting a horizontal linear light;
   a second light source configured to scan a first vertical detection area by emitting a first vertical linear light, wherein the horizontal linear light is perpendicular to the first vertical linear light, and the first vertical detection area crosses a first portion of the horizontal detection area;
   a light sensor; and
   a processor configured to executing one or more of program codes, software modules and instructions recorded in a memory to:
   control the first light source to scan the horizontal detection area by emitting the horizontal linear light;
   control the light sensor to capture a first frame by receiving first reflective lights from the horizontal detection area;
   process the first frame to obtain a first reflection pattern, and analyze the first reflection pattern to determine whether an object is within the first portion;
   in response to determining that the object is within the first portion, control the second light source to scan the first vertical detection area by emitting the first vertical linear light;
   control the light sensor to capture a second frame by receiving second reflective lights from the first vertical detection area; and
   process the second frame to obtain a second reflection pattern, and compare the first reflection pattern with the second reflection pattern to determine whether the object detected by misjudgment caused by the first reflective lights is a fake object, so as to eliminate fake object misjudgment caused by the first reflective lights.

2. The system according to claim 1, further comprising:
   a third light source configured to scan a second vertical detection area by emitting a second vertical linear light, wherein the horizontal linear light is perpendicular to the second vertical linear light, and the second vertical detection area crosses a second portion of the horizontal detection area.

3. The system according to claim 2, wherein the processor is further configured to:
   analyze the first reflection pattern to determine whether the object is within the second portion;
   in response to determining that the object is within the second portion, control the third light source to scan the second vertical detection area by emitting the second vertical linear light;
   control the light sensor to capture a third frame by receiving third reflective lights from the second vertical detection area; and
   process the third frame to obtain a third reflection pattern, and analyze the second reflection pattern, together with the first reflection pattern, to determine whether the object is detected by misjudgment caused by the first reflective lights.

4. The system according to claim 1, further comprising:
   an autonomous robot having a driving system, wherein the driving system includes:
   a plurality of wheels; and a driving circuit configured to control the plurality of wheels, so as to move or rotate the autonomous robot, wherein the autonomous robot is equipped with the first light source, the second light source, the light receiver, and the processor.

5. The system according to claim 4, wherein the processor is further configured to:

control the first light source to scan the horizontal detection area by emitting the horizontal linear light at a first time point and a second time point that is separated from the first time point with a predetermined time period;

control the light sensor to capture the first frame at the first time point, and capture a fourth frame by receiving the fourth reflective lights from the horizontal detection area at the second time point;

process the first frame and the fourth frame to obtain the first reflection pattern and a fourth reflection pattern, respectively, and analyze the first reflection pattern and the fourth reflection pattern to determine whether the object is within the horizontal detection area and does not move within the predetermined time period;

in response to determining that the object is within the horizontal detection area and does not move within the predetermined time period, control the autonomous robot to move toward the object by a predetermined distance through the driving circuit and the plurality of wheels;

control the first light source to scan the horizontal detection area by emitting the horizontal linear light at a third time point that is after the autonomous robot moves the predetermined distance;

control the light sensor to capture a fifth frame by receiving the fifth reflective lights from the horizontal detection area at the third time point; and process the fifth frame to obtain a fifth reflection pattern, and compare the fifth reflection pattern with the first reflection pattern or the fourth reflection pattern to determine whether the object is detected by misjudgment caused by the first reflective lights and the fourth reflective lights.

6. The system according to claim 5, wherein, in a step that the processor is configured to compare the fifth reflection pattern with the first reflection pattern or the fourth reflection pattern to determine whether the object is detected by misjudgment, the processor is further configured to:

determine whether a variation from the first reflection pattern or the fourth reflection pattern to the fifth reflection pattern corresponds to the predetermined distance moved by the autonomous robot; and in response to determining that the variation from the first reflection pattern or the fourth reflection pattern to the fifth reflection pattern does not correspond to the predetermined distance moved by the autonomous robot, determine that the object is detected by misjudgment caused by the first reflective lights and the fourth reflective lights.

7. The system according to claim 4, wherein the processor is further configured to:

process the first frame and analyze the first reflection pattern to determine whether the object is within the horizontal detection area and is not within the first portion;

in response to determining that the object is within the horizontal detection area and is not within the first portion, calculate a predetermined angle according to a position of the object in the horizontal detection area, and control the autonomous robot to rotate with a predetermined angle through the driving circuit and the plurality of wheels, such that the object is within the rotated first portion of the rotated horizontal detection area;

control the second light source to scan the rotated first vertical detection area by emitting the first vertical linear light;

control the light sensor to capture a sixth frame by receiving sixth reflective lights from the first vertical detection area; and process the sixth frame to obtain a sixth reflection pattern, and analyze the sixth reflection pattern to determine whether the object is detected by misjudgment caused by the first reflective lights.

8. The system according to claim 1, wherein, in a step that the processor is configured to process the first frame to obtain the first reflection pattern, the processor is further configured to:

calculate intensities of the first reflective lights recorded in the first frame; and generate the first reflection pattern according to the intensities corresponding to an area corresponding to the horizontal detection area.

9. The system according to claim 8, wherein, in a step that the processor is configured to analyze the first reflection pattern to determine whether the object is within the first portion, the processor is further configured to:

calculate distances according to the first reflection pattern, and determine whether the object is within the horizontal detection area according to the distances; and in response to the determining that the object is within the horizontal detection area, obtain a position of the object according to the distances associated with the object, and determine whether the object is within the first portion.

10. A method for eliminating misjudgment of reflective lights that is sensed by an optical sensing system, which includes a first light source, a second light source, a light sensor, and a processor, wherein the method being performed by the processor comprises:

controlling the first light source to scan a horizontal detection area by emitting a horizontal linear light, wherein the horizontal linear light is perpendicular to a first vertical linear light emitted by the second light source, and a first vertical detection area scanned by emitting the first vertical linear light crosses a first portion of the horizontal detection area;

controlling the light sensor to capture a first frame by receiving first reflective lights from the horizontal detection area;

processing the first frame to obtain a first reflection pattern, and analyzing the first reflection pattern to determine whether an object is within the first portion;

in response to determining that the object is within the first portion, controlling the second light source to scan the first vertical detection area by emitting the first vertical linear light;

controlling the light sensor to capture a second frame by receiving second reflective lights from the first vertical detection area; and processing the second frame to obtain a second reflection pattern, and comparing the first reflection pattern with the second reflection pattern to determine whether the object detected by misjudgment caused by the first reflective lights is a fake object, so as to eliminate fake object misjudgment caused by the first reflective lights.

11. The method according to claim 10, wherein the optical sensing system further includes a third light source, which is configured to be controlled by the processor to scan a second vertical detection area by emitting a second vertical linear light, wherein the horizontal linear light is perpendicular to the second vertical linear light, and the second vertical detection area crosses a second portion of the horizontal detection area.

12. The method according to claim 11, further comprising:
analyzing the first reflection pattern to determine whether the object is within the second portion;
in response to determining that the object is within the second portion, controlling the third light source to scan the second vertical detection area by emitting the second vertical linear light;
controlling the light sensor to capture a third frame by receiving third reflective lights from the second vertical detection area; and
processing the third frame to obtain a third reflection pattern, and analyze the second reflection pattern, together with the first reflection pattern, to determine whether the object is detected by misjudgment caused by the first reflective lights.

13. The method according to claim 10, wherein the optical sensing system further includes an autonomous robot having a driving system, including:
a plurality of wheels; and
a driving circuit configured to control the plurality of wheels, so as to move or rotate the autonomous robot,
wherein the autonomous robot is equipped with the first light source, the second light source, the light receiver, and the processor.

14. The method according to claim 13, further comprising:
controlling the first light source to scan the horizontal detection area by emitting the horizontal linear light at a first time point and a second time point that is separated from the first time point with a predetermined time period;
controlling the light sensor to capture the first frame at the first time point, and capturing a fourth frame by receiving the fourth reflective lights from the horizontal detection area at the second time point;
processing the first frame and the fourth frame to obtain the first reflection pattern and a fourth reflection pattern, respectively, and analyze the first reflection pattern and the fourth reflection pattern to determine whether the object is within the horizontal detection area and does not move within the predetermined time period;
in response to determining that the object is within the horizontal detection area and does not move within the predetermined time period, controlling the autonomous robot to move toward the object by a predetermined distance through the driving circuit and the plurality of wheels;
controlling the first light source to scan the horizontal detection area by emitting the horizontal linear light at a third time point that is after the autonomous robot moves the predetermined distance;
controlling the light sensor to capture a fifth frame by receiving the fifth reflective lights from the horizontal detection area at the third time point; and
processing the fifth frame to obtain a fifth reflection pattern, and comparing the fifth reflection pattern with the first reflection pattern or the fourth reflection pattern to determine whether the object is detected by misjudgment caused by the first reflective lights and the fourth reflective lights.

15. The method according to claim 14, wherein a step of comparing the fifth reflection pattern with the first reflection pattern or the fourth reflection pattern to determine whether the object is detected by misjudgment further includes:
determining whether a variation from the first reflection pattern or the fourth reflection pattern to the fifth reflection pattern corresponds to the predetermined distance moved by the autonomous robot; and
in response to determining that the variation from the first reflection pattern or the fourth reflection pattern to the fifth reflection pattern does not correspond to the predetermined distance moved by the autonomous robot, determine that the object is detected by misjudgment caused by the first reflective lights and the fourth reflective lights.

16. The method according to claim 13, further comprising:
processing the first frame and analyze the first reflection pattern to determine whether the object is within the horizontal detection area and is not within the first portion;
in response to determining that the object is within the horizontal detection area and is not within the first portion, calculating a predetermined angle according to a position of the object in the horizontal detection area, and controlling the autonomous robot to rotate with the predetermined angle through the driving circuit and the plurality of wheels, such that the object is within the rotated first portion of the rotated horizontal detection area;
controlling the second light source to scan the rotated first vertical detection area by emitting the first vertical linear light;
controlling the light sensor to capture a sixth frame by receiving sixth reflective lights from the first vertical detection area; and
processing the sixth frame to obtain a sixth reflection pattern, and analyzing the sixth reflection pattern to determine whether the object is detected by misjudgment caused by the first reflective lights.

17. The method according to claim 10, wherein a step of processing the first frame to obtain the first reflection pattern further includes:
calculating intensities of the first reflective lights recorded in the first frame; and
generating the first reflection pattern according to the intensities corresponding to an area corresponding to the horizontal detection area.

18. The method according to claim 17, wherein a step analyzing the first reflection pattern to determine whether the object is within the first portion, the processor is further configured to:
calculating distances according to the first reflection pattern, and determining whether the object is within the horizontal detection area according to the distances; and
in response to the determining that the object is within the horizontal detection area, obtaining a position of the object according to the distances associated with the object, and determining whether the object is within the first portion.

* * * * *